United States Patent

[11] 3,616,048

[72] Inventors Luigi Bresciani
Via Novembre 69, Mariano Comense;
Antonio Bresciani, Via Cadorna, Carugo
Como, both of Italy

[21] Appl. No. 782,041
[22] Filed Dec. 9, 1968
[45] Patented Oct. 26, 1971
[32] Priority Dec. 11, 1967
[33] Italy
[31] 23.734 A/67

[54] APPARATUS FOR ETCHING A FACE OF A LARGE SIZE GLASS PLATE PREFERABLY ACCORDING TO PREDETERMINED PATTERNS
6 Claims, 4 Drawing Figs.

[52] U.S. Cl. 156/345, 65/31, 118/400, 156/2, 156/24
[51] Int. Cl. C23f 1/02
[50] Field of Search 65/31, 60; 118/400; 134/79, 119; 156/2, 15, 345, 2 Y

[56] References Cited

UNITED STATES PATENTS

| | | | |
|---|---|---|---|
| 3,284,181 | 11/1966 | Harrell et al. | 65/31 |
| 3,373,064 | 3/1968 | Junge et al. | 65/31 X |

FOREIGN PATENTS

| | | | |
|---|---|---|---|
| 906,621 | 9/1962 | Great Britain | 65/31 X |

*Primary Examiner*—S. Leon Bashore
*Assistant Examiner*—John H. Harman
*Attorney*—Young & Thompson

ABSTRACT: Large sheets of glass are etched on a work table that rotates about a horizontal axis. The table provides an upwardly open shallow frame for an upwardly open shallow vessel for etching acid such as hydrofluoric acid. The glass plate itself closes the acid vessel, and a retaining frame clamps the glass plate in sealed relation on the acid vessel. The parts are manipulated when the table is in a vertical position; while the introduction of the acid, the etching, the removal of the acid, and the introduction and removal of wash water are performed while the table is horizontal.

PATENTED OCT 26 1971 3,616,048

INVENTORS

LUIGI BRESCIANI

ANTONIO BRESCIANI

BY Young & Thompson

ATTORNEYS

APPARATUS FOR ETCHING A FACE OF A LARGE SIZE GLASS PLATE PREFERABLY ACCORDING TO PREDETERMINED PATTERNS

The present invention relates to an apparatus and method employing such an apparatus for etching a face of a large size glass plate preferably according to predetermined patterns.

It known to provide small size glass plates having an etched face. For this purpose, various methods and apparatus are used which, however, are not suitable for providing large size plates, since in such case substantially insurmountable difficulties in plate handling and processing would arise. Moreover, further difficulties would result from the high-acid volumes involved, considering that the acid (generally hydrofluoric acid) is extremely noxious.

Therefore, the object of the present invention is to provide for a mass production of large size etched plates; it will then be possible in particular circumstances to employ such plates, whole or more generally to cut the same to the required sizes.

The economical advantages resulting from this invention as compared with the preparation of pluralities of plates of different sized one at a time are apparent. Many other technical advantages, set forth hereinafter, should be added to such economical advantages. The apparatus and method according to the invention are founded on the recognition that large size glass plates are to be handled by holding them in a nearly vertical position, while during acid processing the plates are held in a nearly horizontal position. Substantially, the apparatus according to the invention is characterized by comprising a work table rotatable with respect to a support stand and including a tank for the acid, the table being adapted to clamp a glass between its several parts, so that the plate face to be processed will directly contact the acid in the tank.

The accompanying drawing diagrammatically shows by way of nonrestrictive example an embodiment of the apparatus according to the present invention, and more particularly:

Figures 1, 2, 3, 4:
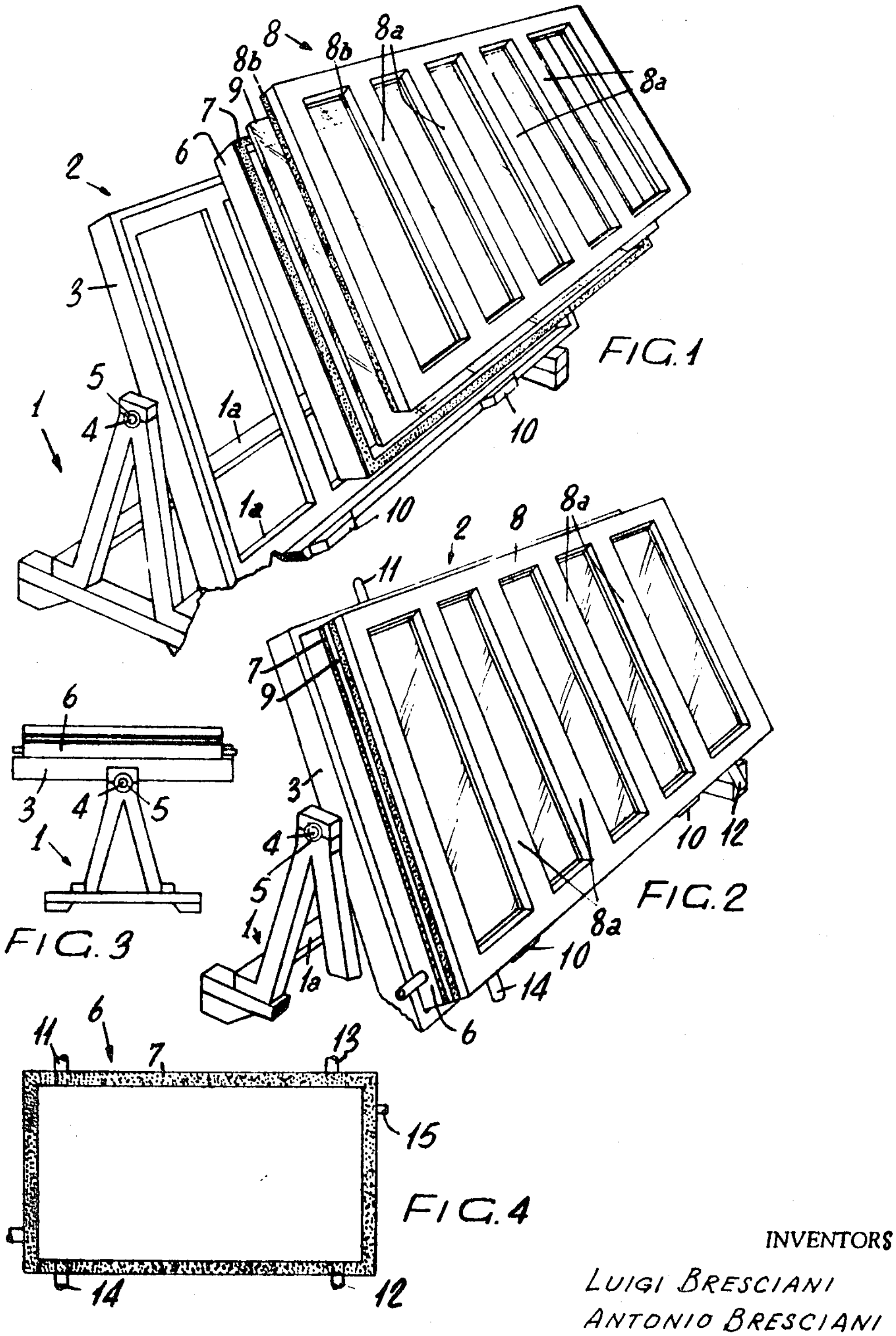
FIG. 1 is an exploded perspective view showing the several parts forming the apparatus, as well as the plate to be processed.
FIG. 2 is a perspective view of the apparatus of FIG. 1, ready for use, the plate being inserted and the working table being nearly vertically positioned.
FIG. 3 is a perspective view similar to that of FIG. 2, but showing the working table as horizontally arranged.
FIG. 4 is a plan view showing the acid tank.

Referring to the drawing, it will be seen that the apparatus according to the present invention for etching a face of a large size glass plate, preferable according to predetermined patterns, comprises a support stand 1, a work table, designated as a whole at 2, and rotatable with respect to said stand. More particularly, said working table 2 comprises first support frame 3 rotable about about a horizontal axis; two shafts 4 are disposed on said geometrical axis, respectively issuing from the median point of two opposite sides of the frame and accommodated within bearings 5 carried by stand 1. Frame 3 is of slightly larger sizes than the glass plate to be processed and has its shape corresponding thereto; for example, its shape will be rectangular, square, circular, etc. depending on the rectangular, square, or circular shape, respectively, of the plate to be processed.

Within frame 3 there is supported and retained a tank 6, the shape of which corresponds to that of frame 3, the outer dimensions thereof almost corresponding to the inner dimensions of the frame 3, and slightly projecting therefrom. Said tank 6 is adapted to contain the acid used for processing (generally hydrofluoric acid) and is made, as appropriate, of a material resisting said acid, such as stainless steel, polyethylene or the like. The sizes of tank 6 are almost the same as those for the plate to be processed and throughout its perimeter said tank has flat edges for providing a support of said plate. More particularly, along all of said peripheral edges the tank is provided with an acid resistant seal 7.

The work table 2 also comprises a retaining frame 8 of the same sizes as tank 6 and which is adapted to peripherally clamp on the plate to be processed (in the drawing designated by 9) locking it against the edges of tank 6. Frame 8 is provided with a plurality of crosspieces **8*a* and carries on one of its faces both at its peripheral portion and along said crosspieces resilient gaskets 8*b* suitable for resting on plate 9. At one of its sides parallel to the axis of rotation, and more particularly at the side which is located in the lower part when the frame is at a nearly vertical position, support frame 3 is provided with two or more projecting brackets 10 for providing a support means of plate 9 and retaining frame 8, as well. A plurality of removable clamping members (such as clamps) are associated with table 2, these members being adapted to clamp said retaining frame 8 against tank 6 after interposing therebetween the plate 9** to be processed, which plate will then the clamped in position. For sake of simplicity, said clamping members are not shown in the drawing.

Particularly referring to FIG. 4, it will be noted that tank 6 for containing the acid is provided with tubular connections 11 and 12, respectively, for acid inlet and outlet, as well as tubular connections 13 and 14, respectively, for washing water inlet and outlet; said tank 6 is also provided with a vent 15. Obviously, the several connections are connected to supply and exhaust lines of the acid and washing water, respectively, whereas vent 15 can be coupled to a suction pump, for removing air when introducing the acid into tank 6. For the sake of simplicity, all such lines are not shown in FIG. 4.

As above stated, the present invention also relates to a method, incorporating the above described apparatus, for etching a face of a large size glass plate preferably according to predetermined patterns. This method comprises the following steps: by holding the work table 2 at a nearly vertical attitude, the glass plate 9 is inserted and clamped between tank 6 and retaining frame 8, so that the face to be processed for example printed by any known system, will face tank 6, so that the negative of the pattern to be made will be covered with an acid resistant paint. Table 2 is rotated to nearly a horizontal position, and tank 6 is filled with acid, the tank being kept filled for the processing period. The acid is then discharged and washing water is circulated within tank 6. After the water is discharged, table 2 is restored to its nearly vertical position and, after disassembling retaining frame 8, the so-processed plate 9 is removed. Referring to the above described method, it should be particularly noted that when the retaining frame 8 is clamped against tank 6, thus locking plate 9, and the crosspieces **8*a* and resilient caskets 8*b* will not impose excessive stresses on plate 9, whereas tank seals 7 ensure such a tank sealing as to prevent any noxious fumes from escaping. It should also be noted that when the working table 2 is at a nearly vertical position, it will rest with the lower end of support frame 3 against the crosspiece 1*a* of stand 1, or against any known type of retainer. Similarly, retainers of any known type and, therefore, not shown, are provided to hold for the time required, said working table 2 in a horizontal position. Preferably, when table 2 is in the horizontal position, it will be kept slightly inclined in a direction coincident with a diagonal of the table. Thus, when tank 6 is being filled, air bubbles which would unavoidably tend to build up, will all collect at a corner; provision will be made so that this corner be located where breather 15 is provided and, therefore, the removal of such bubbles can be effected by suction on connecting said breather 15** with a suction pump.

Therefore, by the apparatus and method according to the present invention, among the others the following advantages can be obtained:

a. The need for protecting the unprocessed face of the glass plate by a protective paint is removed, such a protection being by contrast essential when using known methods.
b. Simplification of the washing step which occurs with the plate at the same position as during acid processing.
c. Any acid fumes are removed since the acid circulates or dwells within a sealed space.
d. Mass production afforded by employing a plurality of the above described devices, which are of comparatively low cost.

e. The handling of each plate, when carrying it to the apparatus and removing it therefrom is effected by holding it in a vertical position, which is optimum for plate safety.

The rotation of each plate, as necessary for arranging it in the horizontal position required by the processing, also occurs under conditions of maximum safety, the plate being clamped and resting within frames avoiding dangerous stresses, therein.

Modifications and changes can be made to the apparatus and method according to the present invention without thereby departing from the scope of the invention.

Particularly, the several parts of the apparatus which, in the example shown, are made of wood, can be made of any material, preferably metal.

Further, although the apparatus and method are generally used for etching a face of a glass plate so as to provide thereon a predetermined or preprinted pattern, this apparatus and method can be used also for etching the whole surface of a face of the plate.

What is claimed is:

1. Apparatus for etching a face of a large glass plate, comprising a work table comprising a support frame, means mounting said support frame for rotation about a horizontal axis between upright and horizontal positions, a shallow open-top tank carried by and projecting from said frame, said tank having an upper edge disposed in a single plane, and a retaining frame coextensive with said tank for clamping a said glass plate on said edge of said tank with said plate closing said tank.

2. Apparatus as claimed in claim 1, and means for introducing and withdraWing etching fluid into and from said tank in a horizontal position of said tank.

3. Apparatus as claimed in claim 2, and means for introducing and withdrawing wash water to and from said tank in a horizontal position of said tank.

4. Apparatus as claimed in claim 1, and sealing means on said edge of said tank to effect a seal between said edge and said glass plate.

5. Apparatus as claimed in claim 1, and support means projecting horizontally from the lower side of said work table when said work table is in said upright position to support said retaining frame and said glass plate in an upright position.

6. Apparatus as claimed in claim 1, and a vent for venting air from said tank.